United States Patent
Batchu et al.

(10) Patent No.: US 11,050,698 B1
(45) Date of Patent: Jun. 29, 2021

(54) MESSAGE PROCESSING SYSTEM WITH BUSINESS EMAIL COMPROMISE DETECTION

(71) Applicant: Area 1 Security, Inc., Redwood City, CA (US)

(72) Inventors: Umalatha N. Batchu, Cupertino, CA (US); YenHsiang Chang, Hayward, CA (US); Torsten Zeppenfeld, Emerald Hills, CA (US); Debashri Mukherjee, Mountain View, CA (US); Paul East, Cary, NC (US)

(73) Assignee: Area 1 Security, Inc., Redwood City, CA (US)

( * ) Notice: Subject to any disclaimer, the term of this patent is extended or adjusted under 35 U.S.C. 154(b) by 0 days.

(21) Appl. No.: 17/026,131

(22) Filed: Sep. 18, 2020

(51) Int. Cl.
*H04L 12/58* (2006.01)
*G06N 20/00* (2019.01)
*G06Q 10/10* (2012.01)

(52) U.S. Cl.
CPC ............. *H04L 51/12* (2013.01); *G06N 20/00* (2019.01); *G06Q 10/107* (2013.01); *H04L 51/02* (2013.01); *H04L 51/22* (2013.01)

(58) Field of Classification Search
None
See application file for complete search history.

(56) References Cited

U.S. PATENT DOCUMENTS

| | | | | |
|---|---|---|---|---|
| 7,366,761 B2* | 4/2008 | Murray | .................... | H04L 51/12 709/206 |
| 7,422,115 B2* | 9/2008 | Zager | .................... | G06Q 10/107 209/206 |
| 7,457,823 B2* | 11/2008 | Shraim | .................... | H04L 51/12 |
| 7,475,118 B2* | 1/2009 | Leiba | .................... | G06Q 10/107 709/206 |
| 7,496,634 B1* | 2/2009 | Cooley | ................ | G06Q 10/107 709/205 |
| 7,529,802 B2* | 5/2009 | Nelson | ................. | G06Q 10/107 709/206 |
| 7,548,544 B2* | 6/2009 | Quinlan | ................ | G06Q 10/107 370/392 |
| 7,552,186 B2* | 6/2009 | Werner | ................ | G06Q 10/107 709/206 |
| 7,707,252 B1* | 4/2010 | Harris | ................... | G06Q 10/107 709/206 |
| 7,769,815 B2* | 8/2010 | Wang | .................... | G06Q 10/107 709/206 |

(Continued)

Primary Examiner — Backhean Tiv
(74) Attorney, Agent, or Firm — Baker Botts L.L.P.

(57) ABSTRACT

In an embodiment, the disclosed technologies monitor electronic message traffic between a network and a recipient computer system. An embodiment includes extracting, from an electronic message received from the network, a sending domain and message data, computing a lookalike score based on the sending domain, and assigning a message type to the electronic message based on the message data. The lookalike score and the message type may be used to determine whether the electronic message is a spoofing attack such as a business email compromise (BEC) attack. In response to determining that the electronic message is malicious, an embodiment may cause the network to at least one of modify, delay, re-route, or block transmission of the electronic message to the recipient computer system.

20 Claims, 5 Drawing Sheets

(56) References Cited

U.S. PATENT DOCUMENTS

| | | | | |
|---|---|---|---|---|
| 7,870,203 B2* | 1/2011 | Judge | .................... | H04W 24/00 |
| | | | | 709/206 |
| 7,870,608 B2* | 1/2011 | Shraim | ................. | H04M 15/43 |
| | | | | 726/22 |
| 8,005,899 B2* | 8/2011 | Cunningham | .......... | H04L 51/12 |
| | | | | 709/206 |
| 8,041,769 B2* | 10/2011 | Shraim | ............... | H04L 63/1491 |
| | | | | 709/206 |
| 8,132,250 B2* | 3/2012 | Judge | .................... | G06Q 10/107 |
| | | | | 726/13 |
| 8,271,588 B1* | 9/2012 | Bruno | .................... | H04L 51/12 |
| | | | | 709/206 |
| 8,392,357 B1* | 3/2013 | Zou | ......................... | H04L 51/12 |
| | | | | 707/602 |
| 8,566,938 B1* | 10/2013 | Prakash | .................. | H04L 51/12 |
| | | | | 726/22 |
| 8,601,064 B1* | 12/2013 | Liao | ........................ | H04L 51/12 |
| | | | | 709/206 |
| 8,612,560 B2* | 12/2013 | Oliver | ..................... | H04L 47/40 |
| | | | | 709/223 |
| 9,015,090 B2* | 4/2015 | Chien | ................. | H04L 63/1408 |
| | | | | 706/22 |
| 9,015,263 B2* | 4/2015 | Styler | ............... | G06F 16/90324 |
| | | | | 709/206 |
| 9,021,028 B2* | 4/2015 | Smith | ................. | G06Q 10/107 |
| | | | | 709/206 |
| 9,781,149 B1* | 10/2017 | Himler | ................... | H04L 69/22 |
| 10,158,677 B1* | 12/2018 | DiCorpo | ................. | H04L 51/12 |
| 10,193,898 B2* | 1/2019 | Gabe | ....................... | H04L 51/12 |
| 10,243,904 B1* | 3/2019 | Wescoe | ................. | H04L 51/12 |
| 10,277,628 B1* | 4/2019 | Jakobsson | ............... | H04L 51/00 |
| 10,284,579 B2* | 5/2019 | Goutal | ................ | H04L 63/1416 |
| 10,298,602 B2* | 5/2019 | Higbee | ................. | H04L 63/1483 |
| 10,341,382 B2* | 7/2019 | Scozzaro | ............ | H04L 63/1483 |
| 10,374,995 B2* | 8/2019 | Lewin-Eytan | .......... | H04L 51/12 |
| 10,397,272 B1* | 8/2019 | Bruss | .................... | G06F 21/568 |
| 10,404,745 B2* | 9/2019 | Verma | ................. | H04L 63/1483 |
| 10,425,444 B2* | 9/2019 | Elworthy | ............ | H04L 63/1408 |
| 10,498,678 B2* | 12/2019 | Murtagh | ................. | H04L 51/12 |
| 10,572,664 B2* | 2/2020 | Hager | ................. | H04L 63/1416 |
| 10,601,865 B1* | 3/2020 | Mesdaq | ................. | H04L 51/12 |
| 10,601,866 B2* | 3/2020 | Bartik | ................. | H04L 63/1483 |
| 10,616,272 B2* | 4/2020 | Chambers | ............ | G06F 16/9024 |
| 10,715,543 B2* | 7/2020 | Jakobsson | ........... | H04L 63/1433 |
| 10,721,195 B2* | 7/2020 | Jakobsson | ............. | H04L 63/083 |
| 10,839,353 B2* | 11/2020 | Rachal | ................. | H04L 63/0236 |
| 10,891,373 B2* | 1/2021 | Humphries | ........... | G06F 21/121 |
| 10,904,186 B1* | 1/2021 | Everton | ................. | H04L 51/12 |
| 10,911,383 B2* | 2/2021 | Smith | ................... | H04L 67/306 |
| 2006/0242251 A1* | 10/2006 | Estable | ................... | H04L 51/12 |
| | | | | 709/207 |
| 2009/0182818 A1* | 7/2009 | Krywaniuk | ............ | H04L 51/28 |
| | | | | 709/206 |

* cited by examiner

MESSAGE PROCESSING SYSTEM WITH BUSINESS EMAIL COMPROMISE DETECTION

TECHNICAL FIELD

One technical field of the present disclosure is business email compromise detection.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Business email compromise (BEC) email attacks, also known as man-in-the-email attacks, are a type of phishing scam. BEC attackers exploit the fact that emails are frequently used to conduct both personal and professional business. A BEC email impersonates a trusted business partner of the email recipient or an individual who is trusted by the email recipient, with the goal of defrauding the recipient. BEC emails often include fake invoices and bills, fake requests to send money, or fake requests to disclose sensitive information.

A BEC attacker may target a particular recipient who may be an individual or an employee of a large organization. Through a grooming period of email exchanges, the BEC attacker builds trust with the targeted recipient such that when the BEC attacker finally sends the targeted recipient an email that requests something of value, such as money or sensitive information, the targeted recipient has been led to believe that they have been communicating with one of their normal business partners and are sending the requested item to a familiar account as part of a normal routine.

BEC attackers are often highly sophisticated enterprises. If the fraud attempt succeeds and is not discovered quickly, the fraudulently obtained asset is often hard to recover because it already has been filtered through other accounts that are difficult to trace.

DETAILED DESCRIPTION

Figure 1:
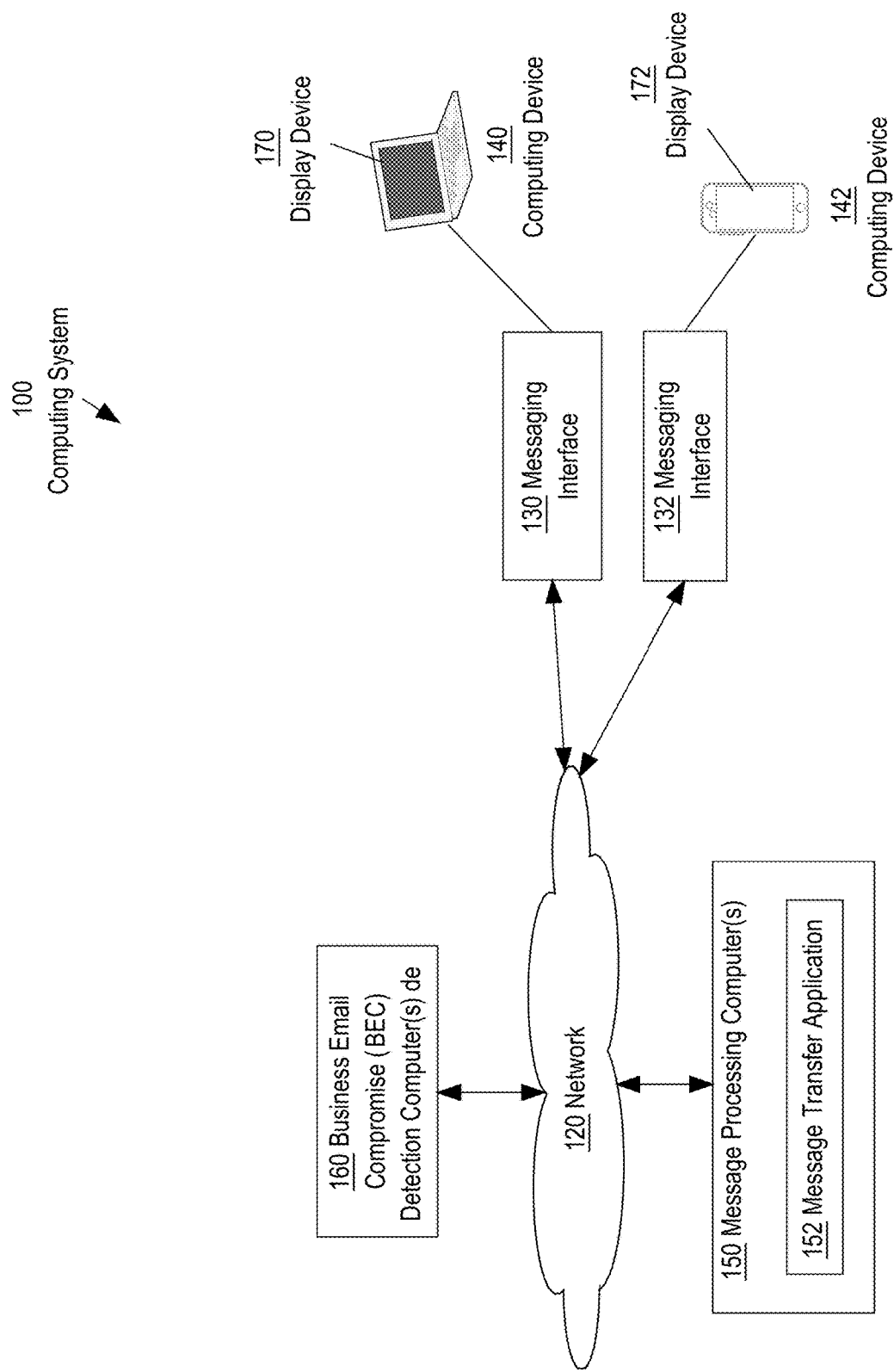
FIG. 1 is a block diagram that depicts an example networked computing system, in an embodiment.

This detailed description refers to the different drawings by specifying the numbers of the figures, and to the different parts by the use of reference numerals. While specific embodiments are described, the subject matter regarded as an invention is particularly pointed out by the appended claims and need not be limited by the details of the described embodiments.

General Overview

BEC attacks are extremely difficult to detect in a large volume of email traffic. In comparison to spam, which is very common and even voluminous, BEC email attacks are only rarely launched against a target organization. BEC emails are also hard to detect because they are engineered to appear as authentic as possible.

A distinguishing feature of a BEC email is the use of domain spoofing. For example, a company's legitimate business partner may have a domain name of baysidelegal.com. A BEC attack may use baysideslegal.com, only one character different from the legitimate domain. BEC attacks are hard to notice, particularly if the email traffic includes frequent, routine, legitimate email exchanges with individuals at baysidelegal.com.

In some scenarios, an attacker breaches security, perhaps by hijacking a user's password, and obtains control of an email account associated with a business entity. The attacker monitors the compromised email account to identify commonly seen sending domains. The attacker conducts what appear to be legitimate email communications using one of the commonly seen sending domains, such as the domain of a business partner with whom the owner of the compromised account is very familiar. After a few reply threads, the attacker switches the sending domain to divert the email conversation to the spoofed domain. The attacker's final email uses the spoofed domain to conduct the phishing attempt, for example by attaching a fake invoice to the email, which the attacker hopes the user will agree to pay.

Other scenarios involve legitimate businesses that rely heavily on email messaging to attract users' attention. These businesses often create many different sending domains in order to avoid spam filters. The sending domains often look like spoofing but are all associated with the same legitimate business. In these scenarios, the technical challenge is to accurately filter out spam while at the same time distinguishing spam from dangerous phishing attempts.

The spoofed email domain is under full control of the attacker and appears legitimate to all known technical approaches. The attacker may go to great lengths to make the email domain look legitimate, including having the malicious email server use an authentic TLS (Transport Layer Security) certificate, sending the email with high grade encryption, and adding strict SPF (Sender Policy Framework), DKIM, (DomainKeys Identified Mail) and DMARC (Domain-based Message Authentication) entries to the malicious email server so that email authentication algorithms are satisfied even though the domain is spoofed.

Existing technical approaches apply name matching heuristics or SMTP (Simple Mail Transfer Protocol) to try to detect BEC emails. The existing technical approaches have been unsuccessful chiefly because it is hard for systems to anticipate all potential lookalike domains for any given legitimate domain. The problem multiplies with every additional legitimate domain. Existing technical approaches often fail when organizations use email to communicate with many different business partners. As a result, many organizations simply recommend training employees to better spot BEC attacks themselves.

Anti-phishing methods that rely solely on lookalike detection methods are often over-inclusive in that even legitimate communications are flagged, resulting in many false positives. False positives detract from the user experience and also negatively affect the user's level of trust with the anti-phishing system. Thus, a technical challenge is to reduce false positives while still detecting and appropriately handling actual phishing messages.

Anti-phishing methods that rely on static whitelists or blacklists are often underinclusive because the whitelists or blacklists cannot be updated quickly enough to keep pace with the attackers. Thus, a technical challenge is to continue detecting and appropriately handling actual phishing messages as attackers continue to change their tactics.

The disclosed technologies address the above and other technical problems and challenges. Embodiments are structured and programmed to dynamically build and maintain a list of legitimate domains based on message traffic between a network and a particular recipient system. Incoming sender domains are compared to domains on the legitimate domain list and assigned a lookalike score. Natural language processing (NLP) techniques are used to extract message data from incoming messages. The message data is used by a set of machine-learned classifiers to classify an incoming message as having or not having particular characteristics. Classification data produced by the machine-learned classifiers is used along with the lookalike score to determine whether a particular message represents a phishing attack, such as a BEC attack or another form of spoofing attack. If an incoming message contains an attachment, the attachment metadata also may be used as a signal of maliciousness.

The disclosed technologies remove the difficult burden of spotting BEC emails from the end users. Embodiments combine machine learning-based techniques with one or more other computations in order to improve automatic BEC attack detection while reducing false positives, particularly in systems that process high volumes of email traffic.

While this disclosure describes the invention in the context of an electronic message application, aspects of the disclosed technologies are equally useful in other applications, such as any application that may benefit from machine learning-based classification of domain data, whether or not the domain data is contained in an email address. The disclosed technologies are applicable to any type of electronic document or message from which domain data can be extracted. In addition, embodiments of the disclosed technologies are not limited to BEC email detection and may be configured to detect other types of spoofing attacks.

Example Computing System

FIG. 1 is a block diagram that depicts an example computing system 100. Computing system 100 is arranged to operate messaging interfaces 130, 132, message processing computer(s) 150, and business email compromise (BEC) detection computer(s) 160, in the transmission of electronic messages from upstream computers to downstream computers. Examples of upstream and downstream computers include sender computers from which electronic messages may originate and recipient computers that may receive electronic messages. For example, computing devices 140, 142 may operate as upstream and/or downstream computers via an electronic communications network 120. Business email compromise (BEC) detection computer(s) 160, computing devices 140, 142, and message processing computer(s) 150 are communicatively coupled to the electronic communications network 120 via for example wired, wireless, and/or optical connections. Display devices 170, 172 are communicatively coupled to computing devices 140, 142, respectively.

Implemented in the computing devices 110, 140, 142, 150, 160 using computer software, hardware, or software and hardware, are processor-executable instructions, data structures, and digital data, stored in memory, which cooperate to provide the computer-implemented functionality described herein. For ease of discussion, these computer-implemented components are represented schematically in the figures that follow, which are described in detail below.

"System" as used herein may refer to a single computer or network of computers and/or other devices. "Computer" or "computing device" as used herein may refer to a computer or any other electronic device that is equipped with a processor. "Processor" as used herein may refer to a software or hardware processor. "Instructions" or "application" as used herein may refer to one or more sets of computer program instructions; in all cases, elements of instructions are capable of computer execution or evaluation to generate output based upon a computer transformation of an input dataset into different digitally stored, electronic data.

"Model" as used herein may refer to one or more sets of computer program instructions and datasets that collectively define representations data, relationships between data or rules or transformations of other data. For example, a model is capable of computer execution or evaluation to generate output that indicates a probabilistic or statistical likelihood that an input or a set of inputs is associated with a particular class, category, type or other characterization.

Although computing system 100 may be implemented with any number of the described components, in this disclosure, these elements may be referred to in the singular form for ease of discussion. Also, while the described computer components are shown as separate elements in the drawings, the illustrations are not meant to imply that separation of these elements is required. The illustrated components may be divided over any number of physical systems or may be contained in a single physical computer system and can communicate with each other in any appropriate manner.

In an embodiment, each of computing devices 140, 142 is a client-side computing device or set of cooperating computing devices, such as a smart phone, tablet computer, wearable or body-mounted device, smart appliance, laptop machine, or combination of any of such devices. In an embodiment, computer(s) 150, 160 are each a server-side computing device such as a server computer or a cluster or network of server computers accessible by the Internet, for example in a public or private cloud. In some embodiments, computer(s) 150, 160 are the same computers or are part of the same computer system. As illustrated in FIG. 1, each of display devices 170, 172 is implemented as part of a computing device 140, 142, respectively, but may be implemented as a separate device or as part of another device, or as multiple networked display devices, in other implementations. Portions of processing described as performed by computer(s) 150 or computer(s) 160 may, in some embodiments, be performed by one or more of computing devices 140, 142.

Messaging interfaces 130, 132 are each client-side messaging software such as a mail client or a messaging application, which reside in memory of computing devices 140, 142, respectively. Malware attacks and other security risks can occur during the transmission of messages or during the download of electronic content from the Internet. Thus, in some embodiments, a message may refer to an electronic file that is downloaded from network 120 to computing devices 140, 142 via messaging interfaces 130, 132. As such, messaging interfaces 130, 132 may be implemented as any type of client-side software applications that are configured to display visual content, such as web browsers, search engines, web-based applications, social media applications. Portions of messaging interfaces 130, 132 may be hosted by a hosting computer (not shown) on the network 120.

Figure 5:
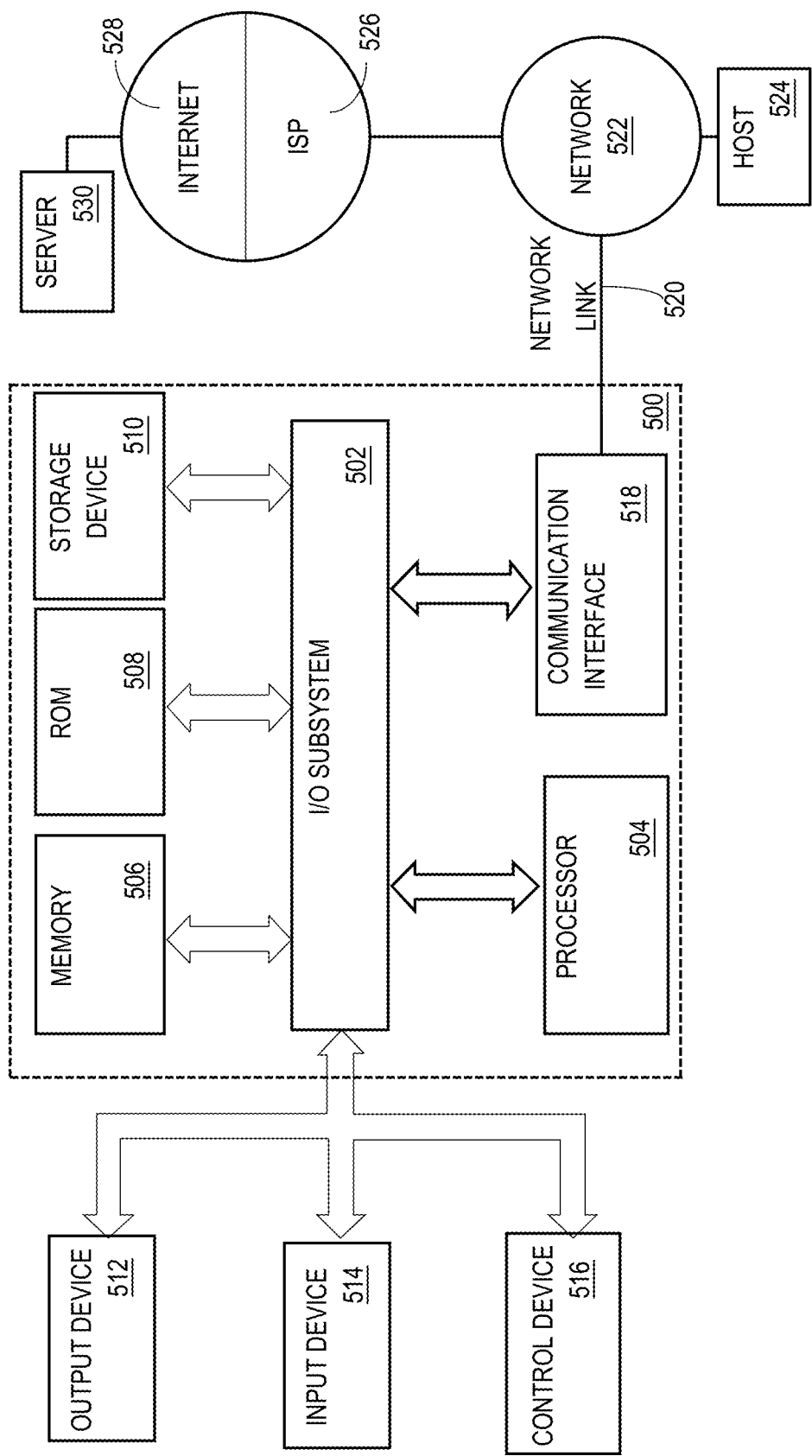
FIG. 5 is a block diagram that illustrates a computer system upon which an embodiment of the present invention may be implemented.

Messaging interfaces 130, 132 cooperate with display devices 170, 172, respectively, to provide graphical user interfaces through which electronic messages can be received, displayed, read, managed, composed, and sent, via human interaction with input and output device(s) of computing devices 140, 142. Examples of input and output device(s) and other components of computing devices 110, 140, 142, 150, 160 are shown in FIG. 5, described below.

Network 120 may be implemented on any medium or mechanism that provides for the exchange of data between the devices that are connected to the network. Examples of network 120 include, without limitation, a network such as a Local Area Network (LAN), Wide Area Network (WAN), Ethernet or the Internet, or one or more terrestrial, satellite or wireless links. Network 120 may include a combination of networks, such as a combination of wired and wireless networks, as needed to enable communications between the computing device(s) 110, 140, 142, 150, 160.

Message processing computer(s) 150 operate message transfer application 152. Message transfer application 152 when executed by a processor controls the transmission of electronic communications between upstream computers and downstream computers, such as computing devices 140, 142, on network 120. Portions of message transfer application 152 may be implemented as or in combination with a text messaging service such as SMS (Short Message Service) or MMS (Multimedia Messaging Service), or as a Voice over Internet (VOIP) server or as a mail server of a public or private electronic mail or messaging system. Portions of message transfer application may be implemented in an online service, such as a social network service, in which electronic messages may include notifications, recommendations, shares, comments, news feeds, tweets, and/or connection requests. Message transfer application 152 may include various message scanning and filtering technologies, such as virus scanners, intrusion detection systems, and/or spam filters.

In an embodiment, message transfer application 152 employs stateless security scanning to scan messages as they are in transit from an upstream computer to one or more downstream computers. Messages may contain attachments in for example the header or the body of the message. An attachment may be accessible by a hyperlink, which may be embedded in the header or the body of the message. A message may contain multiple attachments and metadata for each attachment. When the message scanner detects an incoming message, the message is processed by business email compromise (BEC) detection computer(s) 160 as described below.

After a message is processed by business email compromise (BEC) detection computer(s) 160, message transfer application 152 receives output from business email compromise (BEC) detection computer(s) 160 and determines, based on the output, how to further process the message. For example, message transfer application 152 may determine to modify, delay, re-route, or block the message, or forward the message to a next-hop router or other downstream computer or element of network infrastructure gear.

In an embodiment, message transfer application 152 executes a rule or set of rules to map the output of business email compromise (BEC) detection computer(s) 160 to an appropriate network instruction using, for example, a mapping table or heuristics, and then causes the network instruction that corresponds to the output to be implemented on network 120. Implementation can be performed by a network device such as a mail server or a router executing the network instruction to drop the message, transmit configuration data to a firewall or router, reroute the message to a different machine, or allow the message to proceed to its intended destination.

The network instruction output by message transfer application 152 in response to output produced by business email compromise (BEC) detection computer(s) 160 can include a network command to modify, delay, block, -re-route or forward a message to downstream routers, message transfer agents or other network nodes. An instruction to modify a message may include an instruction to add a notification flag to the message before sending the message downstream; for example, a "SUSPECTED PHISHING" notification added to the subject line of the message, or to re-direct or quarantine the message containing the link, for example by routing the message to a honeynet or quarantine services.

BEC detection computer(s) 160 determine whether messages scanned by message processing computer(s) 150 are business email compromise attack messages and provide output to message processing computer(s) 150. For example, if BEC detection computer(s) determines that a particular message is a BEC attack message, BEC detection computer(s) provide output to message processing computer(s) 150 indicating that the particular message is a BEC attack message. Examples of particular technologies that may be used to implement processes and flows performed by BEC detection computer(s) 160 are described in greater detail below with reference to FIG. 3 and FIG. 4. The processes shown in FIG. 3 and FIG. 4 and described below are not limited to BEC detection. Portions of the processes shown in FIG. 3 and FIG. 4 may be used to perform other types of phishing detection or spoof detection.

Example Messaging System Architecture

Figure 2:
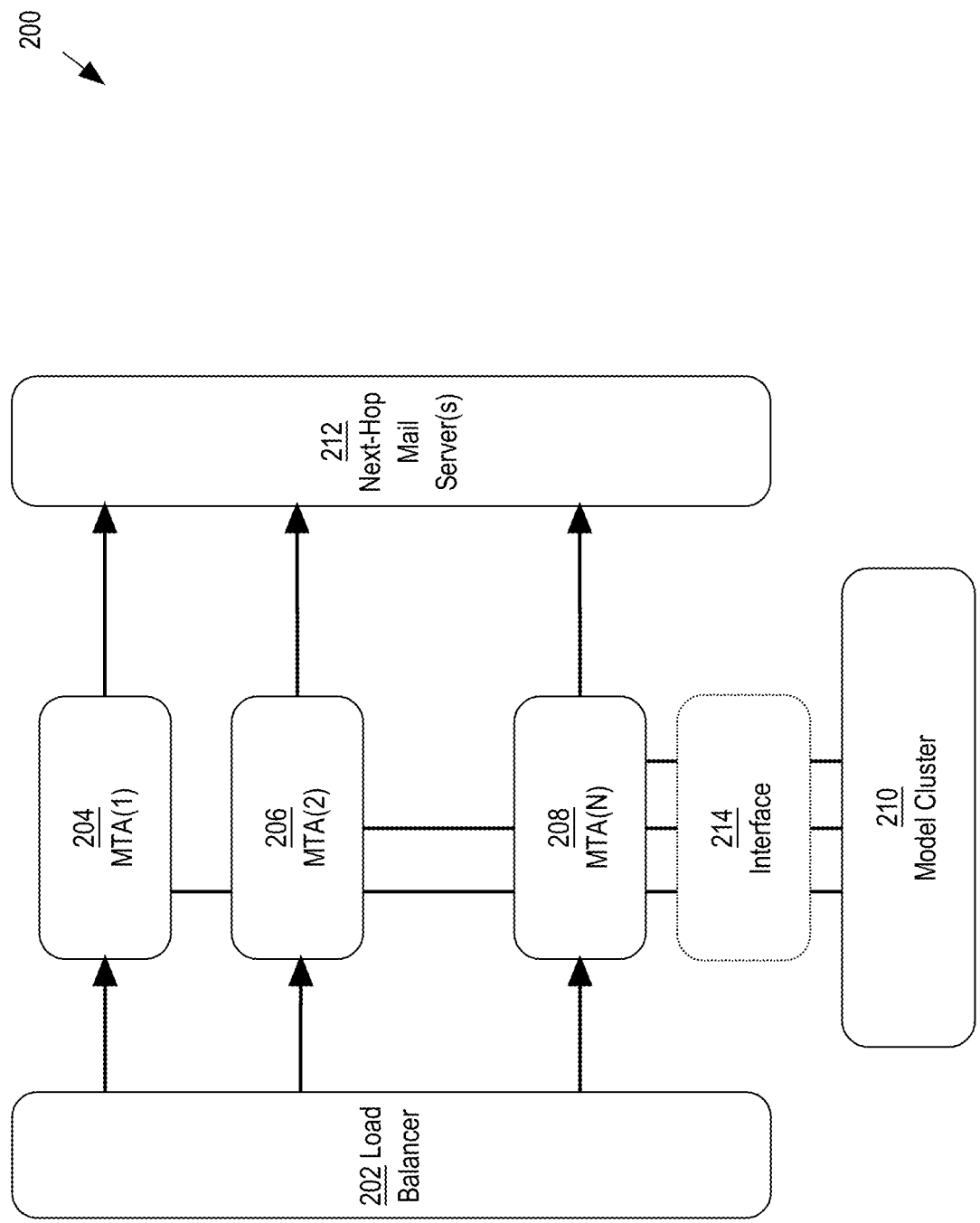
FIG. 2 is a schematic depiction of a portion of the computing system of FIG. 1, in an embodiment.

FIG. 2 illustrates an embodiment of a system architecture in which aspects of the disclosed technologies may be implemented. A network 200 includes network devices 202, 212. Network device 202 is illustratively a load balancer while network device 212 is a next-hop server such as a mail server. Network 200 may be a portion of network 120, described above.

Any number N of message transfer applications (also called agents) (MTAs) 204, 206, 208 are interposed between network devices 202, 212. Thus, electronic messages that are in transit from network device 202 to network device 212 are processed by one or more of MTAs 204, 206, 208 prior to delivery to network device 212. A message scanning application operated by an MTA 204, 206, 208 performs stateless security scanning of messages received from network device 202 and prior to transmission of the messages to network device 212.

In an embodiment, interface 214 is interposed between the MTAs 204, 206, 208 and a model cluster 210. However, portions of interface 214 may be implemented within an MTA 204, 206, 208. An example of interface 214 is an application program interface (API).

Model cluster 210 may be implemented on message processing computer(s) 150 and/or business email compromise (BEC) detection computer(s) 160 and may include one or more machine learning-based model(s) that may be selectively engaged and disengaged by interface 214 for use in connection with the stateless scanning performed by the MTAs 204, 206, 208. In an embodiment, model cluster 210 includes machine learning-based model(s) used by MTAs 204, 206, 208 for many different types of message classification, including classification as spam, classification as legitimate message, classification as phishing, spoofing, or malicious, and classification according to characteristics of the message text, such as any one or more of the message text characteristics described herein. In an embodiment, the computer(s) 150, 160 used to host model cluster 210 are stateless model servers.

Models in model cluster 210 are implemented using, for example, one or more text-based classification modeling approaches, such as logistic regression, random forests, gradient-boosted trees, neural networks, and deep neural networks. For instance, model cluster 210 may include models created using different modeling approaches, or may include models all created using the same modeling approach but with different training data.

Interface 214 when executed by a processor controls the selective engagement of business email compromise (BEC) detection computer(s) 160 by message processing computer(s) 150 in tasks performed by, or requested by, message transfer application 152. Interface 214 manages and facilitates electronic communications of data and instructions between message processing computer(s) 150 and business email compromise (BEC) detection computer(s) 160 during the handling by message transfer application 152 of electronic messages and their respective attachments, for example messages that are being transmitted from computing device 140 to computing device 142, or from computing device 142 to computing device 140, over network 120. Interface 214 is shown as a separate component in FIG. 2 but all or portions of interface 214 may be implemented as part of message transfer application 152. Alternatively, or in addition, some portions of interface 214 may be implemented on business email compromise (BEC) detection computer(s) 160.

Example of BEC Detection Architecture

Figure 3:
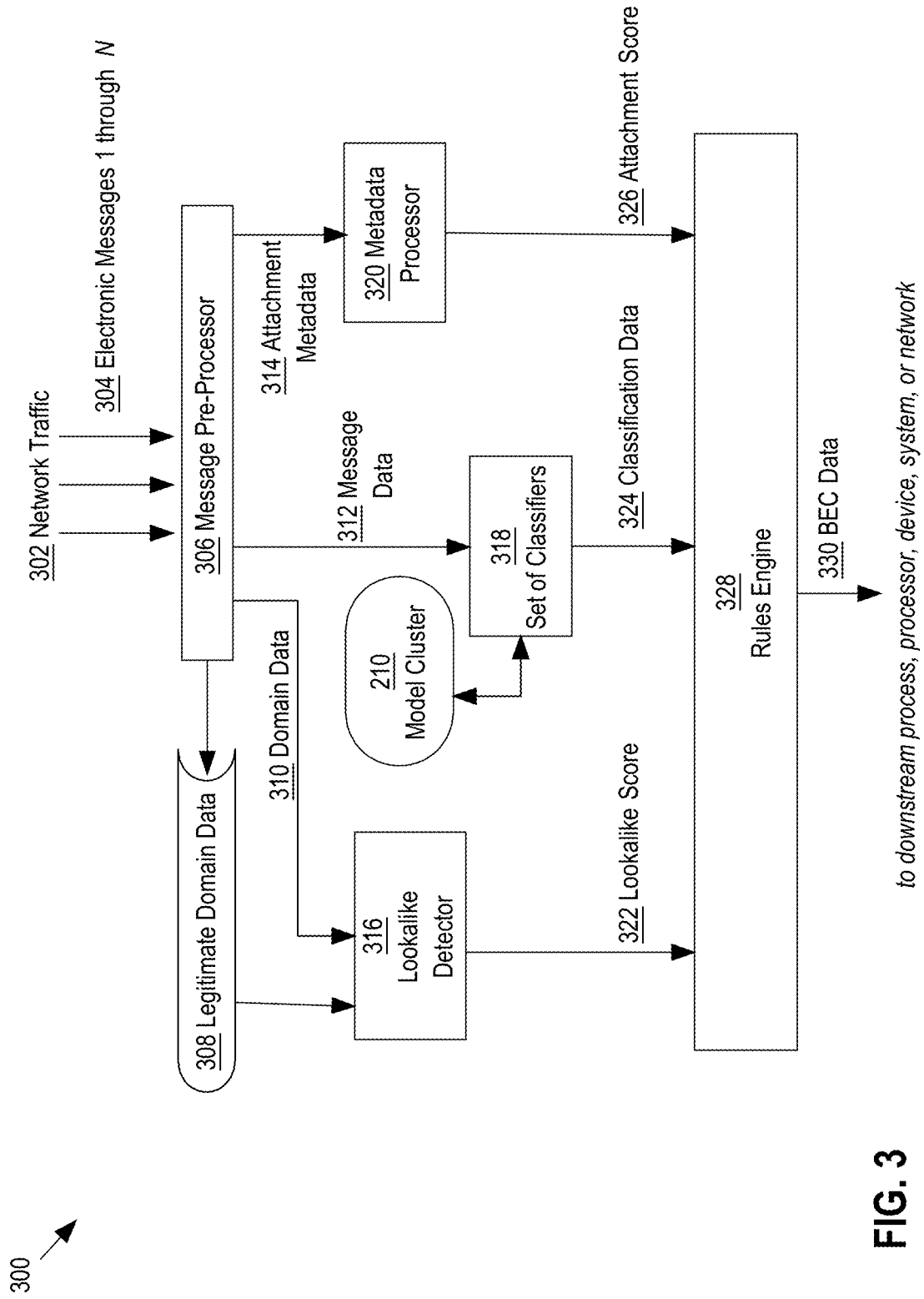
FIG. 3 is a flow diagram that depicts a process, in an embodiment.

In an embodiment, the above-described technologies are used to, automatically and proactively, scan electronic messages for BEC attacks prior to transmission of the messages from a network to a downstream or recipient computer. To that end, FIG. 3 illustrates a system architecture and flow 300 that can be implemented by portions of computing system 100. Flow 300 may be implemented using a single entity or program or by multiple entities or programs, including, for example, a client-side mail or messaging application and a server. The operations shown in FIG. 3 can be implemented using processor-executable instructions that are stored in computer memory. For purposes of providing a clear example, the operations of FIG. 3 are described as performed by one or more computing device(s) 110, 140, 142, 150, 160, which may be individually or collectively referred to as simply 'computing system 100.' Also for clarity, the operations of FIG. 3 are described as evaluating a single message. It should be understood, however, that flow 300 can be used to evaluate any number of messages.

Message Pre-Processor

Message pre-processor 306 scans and pre-processes N electronic messages 304, where N is a positive integer, over a time interval, such as a positive number of seconds, minutes, days, weeks, or months. Electronic messages 304 are part of network traffic 302 flowing between sending computers and recipient computers on a network, such as network 120. Message pre-processor 306 extracts domain data 310 and message data 312 from individual electronic messages 304. Examples of domain data 310 are names of sending domains, such as Internet domain names of the senders of electronic messages (for example, "go.s-untrust.com"), which may or may not be spoofed. Examples of message data 312 include text extracted from individual electronic messages. Message data 312 includes, for example, n-grams extracted from the subject line, the message body, the contents of an attachment, or any combination of the foregoing.

If an individual message 304 contains one or more attachments, message pre-processor 306 extracts attachment metadata 314 from the message. Attachment metadata 314 includes, for a particular attachment, the date/timestamp of the attachment's creation and the date/timestamp of the attachment's most recent modification.

Examples of software used by or as message pre-processor 306 in some embodiments include open source libraries such as TIKA (available from The Apache Foundation), PyRTF (available on SourceForge from oubiwann and scusack), POI (available from The Apache Foundation), OLE-TOOLS (available on GitHub from Philippe Lagadec), or any open source or commercial software product that is capable of extracting data from electronic messages.

Message pre-processor 306 dynamically creates, stores, and maintains a set of legitimate domain data 308 based on domain data 310 extracted from network traffic 302 over a time interval. To do this, message pre-processor 306 uses frequency counting and/or other detection algorithms, which scan incoming messages 304 and algorithmically infer that certain sending domains are legitimate based at least partly on the frequency of occurrence of the sending domain in domain data 310 over time.

For example, if legitimate incoming messages 304 have domain data 310 of a particular sending domain at a high enough frequency that satisfies a frequency count criterion, then that sending domain is considered legitimate and the owner of the domain may be considered a legitimate business partner of the entity using the recipient computer system for which message traffic is being monitored. The frequency count criterion is a configurable criterion that may be determined based on the requirements of a particular implementation. Using message pre-processor 306, network traffic 302 is continuously scanned over time and sending domains that have been determined to be legitimate with respect to the recipient entity are added to legitimate domain data 308. Message pre-processor 306 may be implemented as part of one or more MTAs 208 or as part of interface 214, in some embodiments.

Legitimate domain data 308 may be created and maintained based specifically on network traffic between the network and a particular recipient computer system. Thus, different recipient computer systems may have different versions of legitimate domain data 308 that are independently created based on the network traffic involving those individual recipient computer systems. If different entities use different portions of a recipient computer system to send and receive messages from the network, then a different version of legitimate domain data 308 may be created for each such different entity.

Individual electronic messages of electronic messages 304 are processed individually by message pre-processor 306. The data extracted from each individual message, e.g., domain data 310, message data 312, and attachment metadata 314, are processed by lookalike detector 316, classifier 318, and metadata processor 320, respectively.

Lookalike Detector

Lookalike detector 316 compares the domain data 310 extracted from an individual electronic message 304 to each domain listed in legitimate domain data 308. Based on these comparisons, lookalike detector 316 outputs a lookalike score 322. In an embodiment, lookalike detector 316 performs a domain comparison by computing an edit distance between the domain data 310 and each domain listed in legitimate domain data 308. Thus, the number of edit distance computations may correspond to the number of domains listed in legitimate domain data 308. Some embodiments compute the edit distance using the Levenshtein metric. The Levenshtein metric is a string metric for measuring the difference between two sequences; for example, the minimum number of single-character edits required to change one word into the other.

If the edit distance satisfies a lookalike criterion, the electronic message from which the domain data 310 was extracted and used to compute the edit distance may be identified as a spoofing attack and flagged. If the edit distance does not satisfy the lookalike criterion, the electronic message from which the domain data 310 was extracted may not be identified as a spoofing attack and may not be flagged. An example of a lookalike criterion is a threshold difference between domain data 310 and an entry of legitimate domain data 308 that is less than N characters, where N is a positive integer. The lookalike criterion is a configurable criterion that may be determined based on the requirements of a particular implementation.

Lookalike detector 316 outputs a lookalike score 322 for each domain data 310 that it processes. The lookalike score 322 may be the edit distance or a value that is set based on the comparison of the edit distance to the lookalike criterion. For example, if the edit distance is less than the threshold distance, the lookalike score 322 may be set to 1 as an indication that the domain data 310 indicates a spoofing attack. Likewise, if the edit distance is greater than the threshold distance, the lookalike score 322 may be set to 0 as an indication that the domain data 310 does not indicate a spoofing attack.

Set of Classifiers

The message data 312 extracted from the individual electronic message 304 is processed by a set of classifiers 318. In an embodiment, set of classifiers 318 is a cluster of binary classifiers each of which has a corresponding machine-learned model stored in model cluster 210, where the corresponding model has been trained to recognize, based on message data, a different characteristic of electronic messages. Examples of message characteristics that may be detected by individual classifiers of set of classifiers 318 include but are not limited to: the message contains an invoice, the message is a financial communication, the message is a communication related to a banking account, and/or an the message contains an automated clearinghouse (ACH) communication.

Models associated with set of classifiers 318 have been trained using supervised machine learning and labeled training data representative of particular message characteristics, in some embodiments. For instance, each model may be trained with positive and negative examples of message data representing a particular message characteristic. Training the model may be performed using, for example, a logistic regression algorithm. Other text-based classification modeling approaches, such as random forests, gradient-boosted trees, neural networks, and deep neural networks, can be used to create the models alternatively or in addition to logistic regression and other supervised machine learning approaches.

Once its model has been trained, a particular classifier 318 takes as input the message data 312, e.g., a set of features that have been extracted from a particular electronic message being analyzed, and computes a probability that the electronic message has the particular message characteristic which the classifier 318 has been configured to detect. Classifier 318 may compare the probability value to a threshold value to determine whether the probability is high enough to result in a reliable classification.

Examples of features that may be extracted from electronic messages and included in the set of features include n-grams, such as bi-grams and tri-grams, and embeddings. More generally, a "feature" as used herein may refer to a numerical representation of a portion of text of an electronic message. For example, a sequence of text, such as "routing number" may be represented by a numerical value or a sequence of numerical values that embody semantic and/or syntactic characteristics of the text. Feature extraction can be performed apart from or as part of the classification process.

If the probability value computed by a particular classifier 318 meets or exceeds the threshold value, the classifier 318 may determine that the characteristic that the classifier is configured to detect is present in the electronic message. If the probability value computed by a particular classifier does not meet or exceed the threshold value, classifier 318 may determine that the characteristic that the classifier is configured to detect is not present in the electronic message. The threshold values used by classifiers of the set of classifiers 318 are each independently configurable according to the requirements of a particular implementation.

Set of classifiers 318 outputs classification data 324 for each message 304 that it processes. For example, in an implementation that has three classifiers, including a first classifier configured to detect invoices, a second classifier configured to detect banking account communications, and a third classifier configured to detect ACH data, classification data 324 may include a set of values, such as binary values where 1 indicates a positive classification and 0 indicates a negative classification. The one or more values output by the individual classifiers 218 and included in classification data 324 may be determined and evaluated individually or collectively in any combination, depending on the requirements of a particular implementation.

Metadata Processor

When an electronic message 304 contains an attachment, metadata processor 320 processes the corresponding attachment metadata 314. In an embodiment, attachment metadata 314 includes a creation date of the attachment and a modification date for the attachment. Metadata processor 320 determines the difference between these two date values and based on the comparison of the date values, generates and outputs attachment score 326.

Attachment score 326 may be the actual calculated difference between the two date values or may be a value that is determined based on the calculated difference. A threshold value may be used to determine whether the attachment score 326 is or is not a signal of spoofing. For example, attachment score 326 may be set to 0 if the calculated difference between the date values is less than a certain threshold value or attachment score 326 may be set to 1 if the calculated difference between the date values is greater than or equal to the threshold value. The threshold value is configurable based on the requirements of a particular implementation.

Attachment score 326 may be high if, for example, metadata processor 320 determines that the attachment was modified recently. A high value of attachment score 326 may indicate a higher likelihood that the message associated with the attachment is a spoofing attack, while a low value may indicate that the message associated with the attachment is not a spoofing attack, in some embodiments.

Rules Engine

For an individual message of electronic messages 304, rules engine 328 receives as input lookalike score 322, classification data 324, and, if the message contains an attachment, attachment score 326. Rules engine 328 applies a set of heuristics to these inputs and outputs BEC data 330. The heuristics contained in rules engine 328 may be manually configured and/or configured by an automated process, in accordance with the requirements of a particular implementation. Rules engine 328 may be configured as an expert system, in some embodiments.

BEC data 330 indicates a final determination as to whether a particular message 304 is or is not a phishing attempt, spoofed email, or business email compromise email. Rules engine 328 provides BEC data 330 for use by a downstream process, processor, device, system or network. For example, BEC data 330 may be provided to one or more MTAs 208 for use in determining whether to block, re-route, modify, or delay transmission of the message to the recipient computer system.

Example of Message Classification Process

Figure 4:
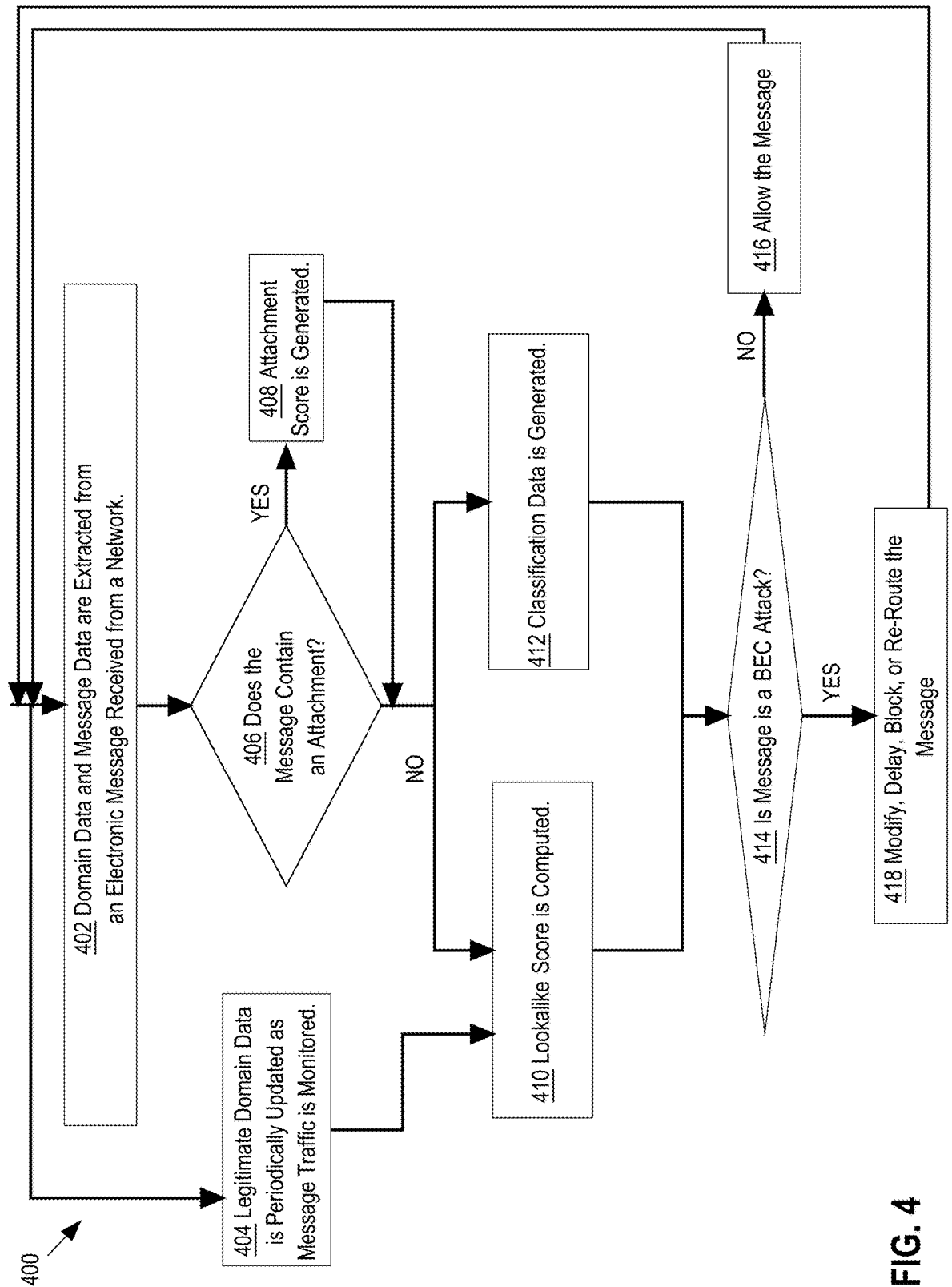
FIG. 4 is a flow diagram that depicts a process, in an embodiment.

In an embodiment, the above-described technologies are used to, automatically and proactively, scan electronic messages prior to transmission of the messages to a downstream computer. To that end, FIG. 4 illustrates a process that can be performed, for example, by computing system 100. FIG. 4 depicts a flow 400 for spoof detection, for example, BEC email detection, in an embodiment. Flow 400 may be performed by a single entity or program or by multiple entities or programs, including, for example, a client-side mail or messaging application and a server.

The operations of flow 400 as shown in FIG. 4 can be implemented using processor-executable instructions that are stored in computer memory. For purposes of providing a clear example, the operations of FIG. 4 are described as performed by one or more computing device(s) 110, 140, 142, 150, 160, which may be individually or collectively referred to as simply 'computing system 100.' Also for clarity, the operations of FIG. 4 are described as evaluating a single message. It should be understood, however, that flow 400 can be used to evaluate any number of messages.

In operation 402, domain data and message data are extracted from an electronic message received from a network. To do this, operation 402 may include processes described above as performed by message pre-processor 306 to extract data from electronic messages. In other embodiments, other processes may be used alternatively or in addition to those described in connection with message pre-processor 306.

In operation 404, legitimate domain data is periodically updated as message traffic is monitored. To do this, operation 404 may include processes described above as performed by message pre-processor 306 to create a list of legitimate domain data. In other embodiments, other processes may be used alternatively or in addition to those described in connection with message pre-processor 306.

In operation 406, flow 400 determines whether the message received by or prior to operation 402 contains an attachment. If the message contains an attachment, flow 400 proceeds to operation 408 prior to operation 410 and operation 412. If the message does not contain an attachment, flow 400 proceeds to operation 410 and operation 412.

In operation 408, an attachment score is generated for the attachment contained in the message. To do this, operation 408 may include processes described above as performed by metadata processor 320. In other embodiments, other processes may be used alternatively or in addition to those described in connection with metadata processor 320.

In operation 410, a lookalike score is computed for the domain data extracted from the message by operation 402. To do this, operation 410 may include processes described above as performed by lookalike detector 316. In other embodiments, other processes may be used alternatively or in addition to those described in connection with lookalike detector 316.

In operation 412, classification data is generated using the message data extracted from the message by operation 402. To do this, operation 412 may include processes described above as performed by set of classifiers 318. In other embodiments, other processes may be used alternatively or in addition to those described in connection with set of classifiers 318.

In operation 414, flow 400 determines whether the message received by or prior to operation 402 is a BEC attack or another form of phishing or spoofing attack. To do this, operation 414 may include processes described above as performed by rules engine 328. In other embodiments, other processes may be used alternatively or in addition to those described in connection with rules engine 328.

If operation 414 determines that the message is not a BEC attack, or another form of phishing or spoofing attack, then, in operation 416, flow 400 allows the message. If operation 414 determines that the message is a BEC attack, or another form of phishing or spoofing attack, then, in operation 418, flow 400 modifies, delays, blocks, or re-routes the message before the message is transmitted to the recipient computing system. Portions of operation 416 and/or operation 418 are performed by one or more MTAs, in an embodiment. In other embodiments, other components may be used alternatively or in addition to the MTAs to perform operation 416 and/or operation 418.

Example—Hardware Overview

According to one embodiment, the techniques described herein are implemented by one or more computing devices. For example, portions of the disclosed technologies may be at least temporarily implemented on a network including a combination of one or more server computers and/or other computing devices. The computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 504 are coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to one or more output devices 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

One or more input devices 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, one or more ASICs or FPGAs, firmware and/or program logic which in combination with the computer system causes or programs computer system 500 to operate as a special-purpose machine. According to one embodiment, the techniques herein are performed by computer system 500 in response to processor 504 executing one or more sequences of one or more instructions contained in memory 506. Such instructions may be read into memory 506 from another storage medium, such as storage device 510. Execution of the sequences of instructions contained in memory 506 causes processor 504 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to one or more communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through one or more networks to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Additional Examples

Illustrative examples of the technologies disclosed herein are provided below. An embodiment of the technologies may include any of the examples described below.

In an example 1, a method includes, while monitoring electronic message traffic from a network and a recipient computer system over a time interval, extracting, from an electronic message received from the network, digital data including a sending domain and message data; computing a lookalike score between the sending domain and a legitimate domain of a set of legitimate domains; the set of legitimate domains having been created from the electronic message traffic; inputting the message data into each classifier of a plurality of different classifiers, respectively, each classifier having been machine-learned to determine probabilities that electronic messages have a particular message characteristic; assigning a message type to the electronic message based on output of the plurality of different classifiers; using the lookalike score and the message type, determining whether the electronic message is a business email compromise (BEC) attack; in response to determining that the electronic message is a BEC attack, causing the network to at least one of modify, delay, re-route, or block transmission of the electronic message to the recipient computer system.

An example 2 includes the subject matter of example 1, further including computing the lookalike score by computing an edit distance between the sending domain and each domain of the set of legitimate domains, and determining whether the electronic message is a BEC attack based at least in part on whether any of the computed edit distances satisfies a lookalike criterion. An example 3 includes the subject matter of example 1 or example 2, the message data including a set of features extracted from the electronic message, each classifier configured to use the set of features to compute a probability that the electronic message has the particular message characteristic. An example 4 includes the subject matter of any of examples 1-3, the particular message characteristic selected from a group including an invoice, a financial communication, a communication related to a banking account, an automated clearinghouse (ACH) communication. An example 5 includes the subject matter of any of examples 1-4, further including determining that the electronic message includes an attachment, extracting attachment metadata from the electronic message, and using the attachment metadata, determining whether the electronic message is a BEC attack. An example 6 includes the subject matter of example 5, the attachment metadata including creation date data and modification date data, the method further including, in response to a difference between the creation date data and the modification date data satisfying a recency criterion, determining that the electronic message is a BEC attack. An example 7 includes the subject matter of any of examples 1-6, the set of legitimate domains having been created from the electronic message traffic by comparing frequency counts of legitimate electronic messages received from particular sending domains to a frequency count criterion. An example 8 includes the subject matter of any of examples 1-7, the set of legitimate domains including sending domains of legitimate business partners of an entity that uses the recipient computer system to electronically conduct business transactions.

In an example 9, an apparatus includes one or more non-transitory computer-readable storage media including instructions which, when executed by one or more processors, cause the one or more processors to be capable of performing operations including: while monitoring electronic message traffic from a network and a recipient computer system over a time interval, extracting, from an electronic message received from the network, digital data including a sending domain and message data; computing a lookalike score between the sending domain and a legitimate domain of a set of legitimate domains; the set of legitimate domains having been created from the electronic message traffic; inputting the message data into each classifier of a plurality of different classifiers, respectively, each classifier having been machine-learned to determine probabilities that electronic messages have a particular message characteristic;

assigning a message type to the electronic message based on output of the plurality of different classifiers; using the lookalike score and the message type, determining whether the electronic message is a business email compromise (BEC) attack; in response to determining that the electronic message is a BEC attack, causing the network to at least one of modify, delay, re-route, or block transmission of the electronic message to the recipient computer system.

An example 10 includes the subject matter of example 9, the instructions, when executed by one or more processors, further causing the one or more processors to be capable of performing operations including computing the lookalike score by computing an edit distance between the sending domain and each domain of the set of legitimate domains, and determining whether the electronic message is a BEC attack based at least in part on whether any of the computed edit distances satisfies a lookalike criterion. An example 11 includes the subject matter of example 9 or example 10, the message data including a set of features extracted from the electronic message, each classifier configured to use the set of features to compute a probability that the electronic message has the particular message characteristic. An example 12 includes the subject matter of any of examples 9-11, the particular message characteristic selected from a group including an invoice, a financial communication, a communication related to a banking account, an automated clearinghouse (ACH) communication. An example 13 includes the subject matter of any of examples 9-12, the instructions, when executed by one or more processors, further causing the one or more processors to be capable of performing operations including determining that the electronic message includes an attachment, extracting attachment metadata from the electronic message, the attachment metadata including creation date data and modification date data, in response to a difference between the creation date data and the modification date data satisfying a recency criterion, determining that the electronic message is a BEC attack. An example 14 includes the subject matter of any of examples 9-13, the set of legitimate domains having been created from the electronic message traffic by comparing frequency counts of legitimate electronic messages received from particular sending domains to a frequency count criterion, the set of legitimate domains including sending domains of legitimate business partners of an entity that uses the recipient computer system to electronically conduct business transactions.

In an example 15, a system includes one or more processors; one or more non-transitory storage media storing instructions which, when executed by the one or more processors, cause the one or more processors to be capable of: while monitoring electronic message traffic from a network and a recipient computer system over a time interval, extracting, from an electronic message received from the network, digital data including a sending domain and message data; computing a lookalike score between the sending domain and a legitimate domain of a set of legitimate domains; the set of legitimate domains having been created from the electronic message traffic; inputting the message data into each classifier of a plurality of different classifiers, respectively, each classifier having been machine-learned to determine probabilities that electronic messages have a particular message characteristic; assigning a message type to the electronic message based on output of the plurality of different classifiers; using the lookalike score and the message type, determining whether the electronic message is a business email compromise (BEC) attack; in response to determining that the electronic message is a BEC attack, causing the network to at least one of modify, delay, re-route, or block transmission of the electronic message to the recipient computer system.

An example 16 includes the subject matter of example 15, the instructions, when executed by one or more processors, further causing the one or more processors to be capable of performing operations including computing the lookalike score by computing an edit distance between the sending domain and each domain of the set of legitimate domains, and determining whether the electronic message is a BEC attack based at least in part on whether any of the computed edit distances satisfies a lookalike criterion. An example 17 includes the subject matter of example 15 or example 16, the message data including a set of features extracted from the electronic message, each classifier configured to use the set of features to compute a probability that the electronic message has the particular message characteristic. An example 18 includes the subject matter of any of examples 15-17, the particular message characteristic selected from a group including an invoice, a financial communication, a communication related to a banking account, an automated clearinghouse (ACH) communication. An example 19 includes the subject matter of any of examples 15-18, the instructions, when executed by one or more processors, further causing the one or more processors to be capable of performing operations including determining that the electronic message includes an attachment, extracting attachment metadata from the electronic message, the attachment metadata including creation date data and modification date data, in response to a difference between the creation date data and the modification date data satisfying a recency criterion, determining that the electronic message is a BEC attack. An example 20 includes the subject matter of any of examples 15-19, the set of legitimate domains having been created from the electronic message traffic by comparing frequency counts of legitimate electronic messages received from particular sending domains to a frequency count criterion, the set of legitimate domains including sending domains of legitimate business partners of an entity that uses the recipient computer system to electronically conduct business transactions.

GENERAL CONSIDERATIONS

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including,"

"includes," "comprising," "comprises," "comprised" and the like) are intended to be inclusive and are not intended to exclude further features, components, integers or steps. Throughout this disclosure, an element that is identified by a noun followed by the letter s in parentheses, as in (s), indicates that one or more of the element may be used in various embodiments.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   while monitoring electronic message traffic from a network and a recipient computer system over a time interval, extracting, from an electronic message received from the network, digital data comprising a sending domain and message data;
   computing a lookalike score between the sending domain and a legitimate domain of a set of legitimate domains;
   the set of legitimate domains having been created from the electronic message traffic;
   inputting the message data into each classifier of a plurality of different classifiers, respectively, each classifier having been machine-learned to determine probabilities that electronic messages have a particular message characteristic;
   assigning a message type to the electronic message based on output of the plurality of different classifiers;
   using the lookalike score and the message type, determining whether the electronic message is a business email compromise (BEC) attack;
   in response to determining that the electronic message is a BEC attack, causing the network to at least one of modify, delay, re-route, or block transmission of the electronic message to the recipient computer system.

2. The method of claim 1, further comprising computing the lookalike score by computing an edit distance between the sending domain and each domain of the set of legitimate domains, and determining whether the electronic message is a BEC attack based at least in part on whether any of the computed edit distances satisfies a lookalike criterion.

3. The method of claim 1, the message data comprising a set of features extracted from the electronic message, each classifier configured to use the set of features to compute a probability that the electronic message has the particular message characteristic.

4. The method of claim 1, the particular message characteristic selected from a group comprising an invoice, a financial communication, a communication related to a banking account, an automated clearinghouse (ACH) communication.

5. The method of claim 1, further comprising determining that the electronic message comprises an attachment, extracting attachment metadata from the electronic message, and using the attachment metadata, determining whether the electronic message is a BEC attack.

6. The method of claim 5, the attachment metadata comprising creation date data and modification date data, the method further comprising, in response to a difference between the creation date data and the modification date data satisfying a recency criterion, determining that the electronic message is a BEC attack.

7. The method of claim 1, the set of legitimate domains having been created from the electronic message traffic by comparing frequency counts of legitimate electronic messages received from particular sending domains to a frequency count criterion.

8. The method of claim 1, the set of legitimate domains comprising sending domains of legitimate business partners of an entity that uses the recipient computer system to electronically conduct business transactions.

9. An apparatus comprising:
   one or more non-transitory computer-readable storage media comprising instructions which, when executed by one or more processors, cause the one or more processors to be capable of performing operations comprising:
   while monitoring electronic message traffic from a network and a recipient computer system over a time interval, extracting, from an electronic message received from the network, digital data comprising a sending domain and message data;
   computing a lookalike score between the sending domain and a legitimate domain of a set of legitimate domains;
   the set of legitimate domains having been created from the electronic message traffic;
   inputting the message data into each classifier of a plurality of different classifiers, respectively, each classifier having been machine-learned to determine probabilities that electronic messages have a particular message characteristic;
   assigning a message type to the electronic message based on output of the plurality of different classifiers;
   using the lookalike score and the message type, determining whether the electronic message is a business email compromise (BEC) attack;
   in response to determining that the electronic message is a BEC attack, causing the network to at least one of modify, delay, re-route, or block transmission of the electronic message to the recipient computer system.

10. The apparatus of claim 9, the instructions, when executed by one or more processors, further causing the one or more processors to be capable of performing operations comprising computing the lookalike score by computing an edit distance between the sending domain and each domain of the set of legitimate domains, and determining whether the electronic message is a BEC attack based at least in part on whether any of the computed edit distances satisfies a lookalike criterion.

11. The apparatus of claim 9, the message data comprising a set of features extracted from the electronic message, each classifier configured to use the set of features to compute a probability that the electronic message has the particular message characteristic.

12. The apparatus of claim 9, the particular message characteristic selected from a group comprising an invoice, a financial communication, a communication related to a banking account, an automated clearinghouse (ACH) communication.

13. The apparatus of claim 9, the instructions, when executed by one or more processors, further causing the one or more processors to be capable of performing operations comprising determining that the electronic message comprises an attachment, extracting attachment metadata from the electronic message, the attachment metadata comprising creation date data and modification date data, in response to a difference between the creation date data and the modification date data satisfying a recency criterion, determining that the electronic message is a BEC attack.

14. The apparatus of claim 9, the set of legitimate domains having been created from the electronic message traffic by comparing frequency counts of legitimate electronic messages received from particular sending domains to a frequency count criterion, the set of legitimate domains comprising sending domains of legitimate business partners of an entity that uses the recipient computer system to electronically conduct business transactions.

15. A system comprising:
one or more processors;
one or more non-transitory storage media storing instructions which, when executed by the one or more processors, cause the one or more processors to be capable of:
while monitoring electronic message traffic from a network and a recipient computer system over a time interval, extracting, from an electronic message received from the network, digital data comprising a sending domain and message data;
computing a lookalike score between the sending domain and a legitimate domain of a set of legitimate domains; the set of legitimate domains having been created from the electronic message traffic;
inputting the message data into each classifier of a plurality of different classifiers, respectively, each classifier having been machine-learned to determine probabilities that electronic messages have a particular message characteristic;
assigning a message type to the electronic message based on output of the plurality of different classifiers;
using the lookalike score and the message type, determining whether the electronic message is a business email compromise (BEC) attack;
in response to determining that the electronic message is a BEC attack, causing the network to at least one of modify, delay, re-route, or block transmission of the electronic message to the recipient computer system.

16. The system of claim 15, the instructions, when executed by one or more processors, further causing the one or more processors to be capable of performing operations comprising computing the lookalike score by computing an edit distance between the sending domain and each domain of the set of legitimate domains, and determining whether the electronic message is a BEC attack based at least in part on whether any of the computed edit distances satisfies a lookalike criterion.

17. The system of claim 15, the message data comprising a set of features extracted from the electronic message, each classifier configured to use the set of features to compute a probability that the electronic message has the particular message characteristic.

18. The system of claim 15, the particular message characteristic selected from a group comprising an invoice, a financial communication, a communication related to a banking account, an automated clearinghouse (ACH) communication.

19. The system of claim 15, the instructions, when executed by one or more processors, further causing the one or more processors to be capable of performing operations comprising determining that the electronic message comprises an attachment, extracting attachment metadata from the electronic message, the attachment metadata comprising creation date data and modification date data, in response to a difference between the creation date data and the modification date data satisfying a recency criterion, determining that the electronic message is a BEC attack.

20. The system of claim 15, the set of legitimate domains having been created from the electronic message traffic by comparing frequency counts of legitimate electronic messages received from particular sending domains to a frequency count criterion, the set of legitimate domains comprising sending domains of legitimate business partners of an entity that uses the recipient computer system to electronically conduct business transactions.

* * * * *